INVENTORS
EDWARD F. KATZENBERGER
JOHN E.A. STEINBACK

INVENTORS.
EDWARD F. KATZENBERGER
JOHN E.A. STEINBACK

United States Patent Office 3,050,277
Patented Aug. 21, 1962

3,050,277
RETRACTABLE ROTOR MECHANISM
Edward F. Katzenberger, Westport, and John E. A. Steinbeck, Stamford, Conn., assignors to the United States of America as represented by the Secretary of the Air Force
Filed Nov. 13, 1959, Ser. No. 852,918
2 Claims. (Cl. 244—17.27)

This invention relates to aircraft of the type which are capable of both horizontal flight as a conventional airplane and vertical flight as a helicopter. A prime advantage of such aircraft, commonly known as convertiplanes, lies in their low speed take-off and landing characteristics combined with their ability to achieve high speed and economy in normal flight.

In the convertiplane, a horizontal rotor is provided for low speed situations which permits substantially vertical take-off and landing in a small area. The rotor may also be employed to assist in supporting or stabilizing the aircraft over the intermediate range of its speed; however, when it is desired to use the conventional high speed characteristics of the aircraft, it is essential that the rotor and its mounting be retracted to a position out of the airstream. If this is not accomplished, they will impose a heavy drag on the aircraft and severely limit its performance characteristics.

Accordingly, it is an object of this invention to provide an improved rotor positioning mechanism for convertiplanes.

It is another object of this invention to provide a rotor positioning mechanism which permits positive and more precise movement of the rotor.

A further object of this invention is to provide a mechanism having increased structural support or rigidity for a rotor in its extended position.

Still another object of the invention is to provide an improved rotor positioning mechanism which will not interfere with the pitch control of a rotor blade.

A still further object of this invention involves the provision of a rotor positioning mechanism that is economical to produce of conventional, currently available materials that lend themselves to standard mass production manufacturing techniques.

These and other advantages, features and objects of this invention will become apparent upon consideration of the following detailed description of an embodiment thereof, especially when taken in conjunction with the accompanying drawings wherein.

Figure 1:
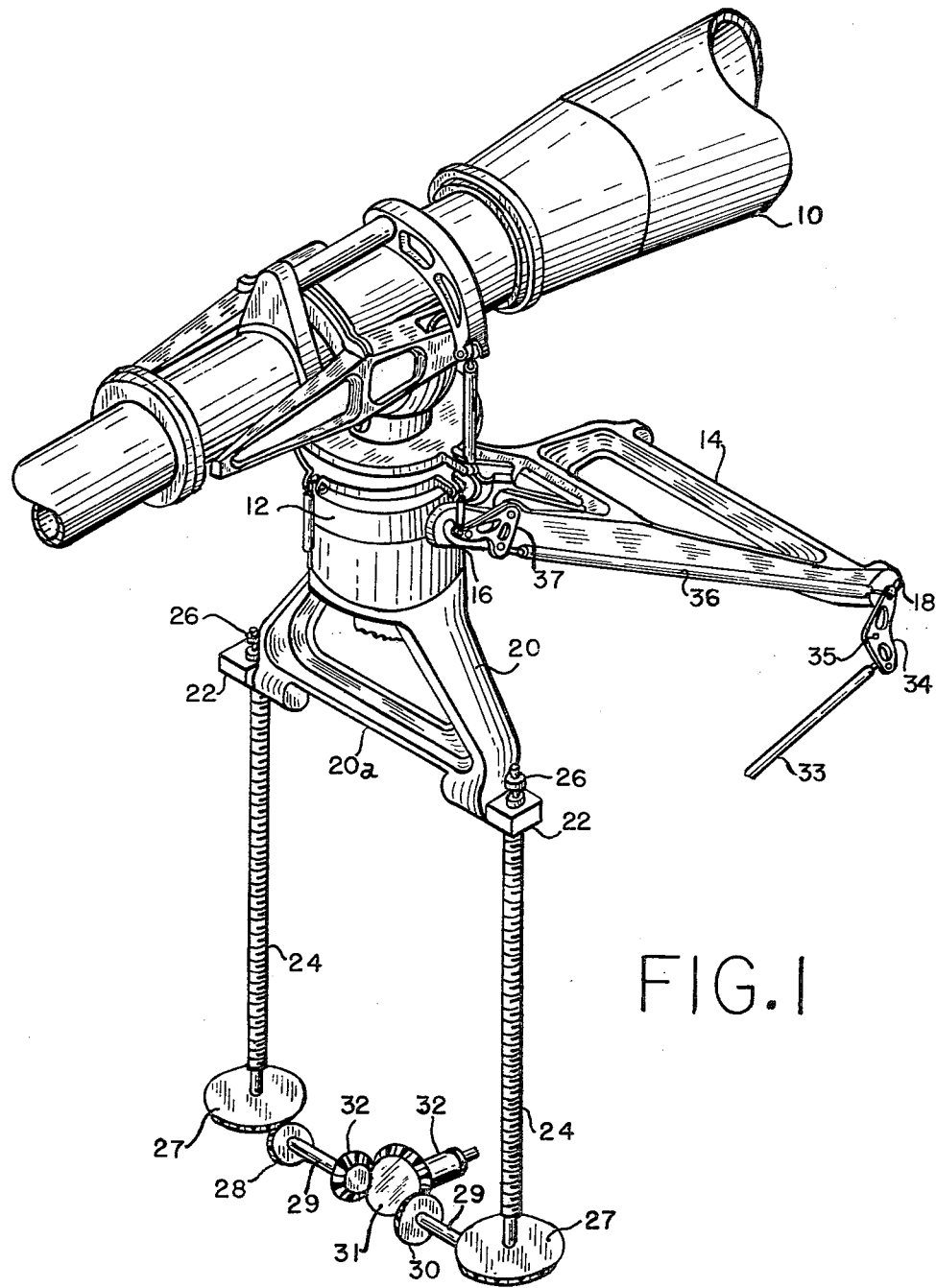
FIGURE 1 is a perspective view of the mechanism of the invention, only the central portion of the rotor being shown.
Figure 2:
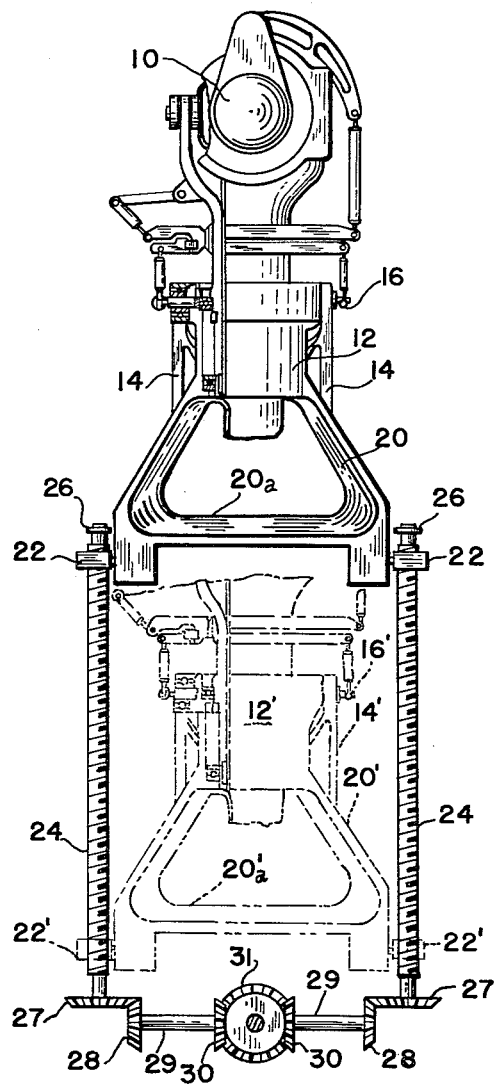
FIGURE 2 is a front elevation of the mechanism, the extended position being shown in full lines and the retracted position being shown in broken lines.
Figure 3:
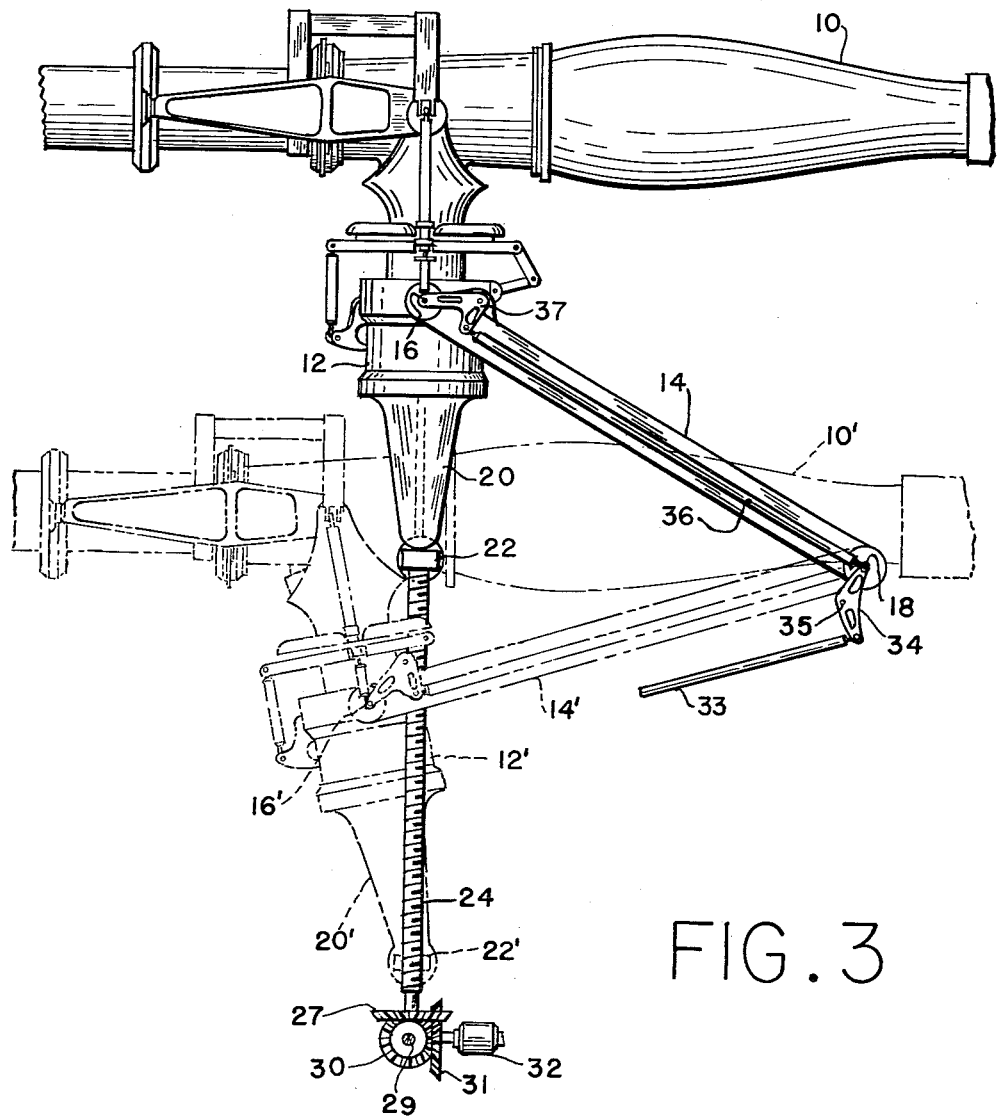
FIGURE 3 is a side elevation of the mechanism, the extended position being shown in full lines and the retracted position being shown in broken lines.

Referring specifically to the drawings wherein like characters of reference indicate like parts, a rotor blade is shown at 10 and is mounted on a cylindrical rotor head 12. In a convertiplane aircraft, the rotor blade is generally driven by means of compressed air; however, the specific structural details of such a drive form no part of the instant invention. It need only be stated that the drive has ducts therethrough which supply air by means of a hollow mast which passes through the rotor head 12. A wishbone or yoke 14 has its upper end journalled to the rotor head 12 at 16. The opposite or lower end of said wishbone 14 is journalled at 18 to the fuselage (not shown) of the aircraft.

Formed integral with the rotor head and extending downwardly is a support bracket 20 which includes a pair of diverging legs joined at their outer ends by a crossbar 20a. A lip 22 is pivotally attached at right angles to the end of each of said legs and has a threaded passage completely therethrough. Screwjacks 24 are received in each bore and stop devices 26 are secured on one end of each of said jacks. Any suitable support means may be employed to mount the jacks 24 on the fuselage.

Driving means for the jacks takes the form of a bevel gear arrangement wherein a gear 27 on the end of each screwjack 24 is driven by a mating gear 28 which is secured to the end of a shaft 29. Bevel gears 30 are fixed to shaft 29 and are arranged to mesh with driving gear 31 which is driven by a reversible electric motor 32 or other conventional drive means, such that conjoint movement of jacks 24 causes crossbar 20a of the support bracket 20 to remain in the same plane, thus avoiding a tilting of the support bracket.

The pitch control for rotor 10 may be arranged in order to avoid the affecting of the pitch control by the extension or retraction movement of the rotor head. A lever 33 which goes to the pilot's compartment is pivotally connected to bellcrank 34 which is in turn pivotally connected to the fuselage at 35 such that when the blade is in its feathered position the pivot point of the force transmitting end of bellcrank 34 in which a pitch control rod 36 is journalled falls in alignment with the axis 18 of the wishbone 14 wherein said wishbone is journalled. The swash plate and connections to the blade horn are not herein described since their particular configurations form no part of the instant invention. By virtue of the location of the pitch control rod, no change in blade pitch is effected by movement of the rotor to its extended or retracted positions. The other end of pitch control rod 36 is journalled to a bellcrank 37 which is pivoted to wishbone 14 such that the portion of bellcrank 37 attached to the pitch control mechanism on the rotor head falls in line with the axis through journals 16. The pitch control mechanism comprises a linkage to a swash plate which in turn is connected to a blade horn for varying the blade pitch in a manner conventional in the art. When the rotor is being used, the rotor head is in the approximate position shown in solid lines. After the blade has been feathered, motor 32 is started to turn the screwjacks 24 by means of the bevel gearing to draw the rotor head about the wishbone journals down into the fuselage to the position substantially as shown in dotted lines. By virtue of the arrangement of the pivot points of the pitch control means, the retraction operation does not affect the pitch.

Reversal of motor 32 drives the screwjacks in the opposite direction to raise the rotor head to its operative position.

It is thus evident that a means to retract and extend a jet operated rotor head of a convertiplane by power operated means such that there is a positive positioning of the rotor head in its operative and inoperative positions without the necessity for separate stop or locking means while simultaneously providing a rigid support for the rotor has been presented.

Although the invention has been described with reference to a particular embodiment, it will be understood to those skilled in the art that the invention is capable of a variety of alternative embodiments within the spirit and scope of the appended claims.

We claim:
1. In an aircraft having a fuselage, means for extending a horizontal rotor mechanism to a vertical position with respect to the horizontal axis of the fuselage and above said fuselage and retracting said rotor mechanism to a position within said fuselage, and at an acute angle with respect to the horizontal axis of said fuselage, said means comprising a support bracket secured to said rotor mechanism, screwjack means threadably engaged with said bracket and fixedly supported with respect to said fuselage, means for driving said screwjack means for extending and retracting said rotor mechanism, a yoke pivotally secured to said rotor mechanism at one end and to the fuselage at its other end for guiding said rotor mechanism during its movement with said support bracket for providing a rigid support for said rotor mechanism, a blade for said rotor mechanism, pitch control means for regulating the pitch of said blade, and a pitch control linkage for actuating said pitch control means, said linkage comprising, a pitch control rod, a bellcrank pivotally connected at each end of said rod, one of said bellcranks being pivotally connected to a linkage for actuation of said control rod, the other of said bellcranks being pivotally connected to said pitch control means for changing the pitch of said blade, said bellcranks being so arranged that when said blade is in its feathered position the pivotal points of said connection with said pitch control mechanism and said connection with said linkage for actuation of said control rod fall in alignment with the pivotal connections of said yoke.

2. A mechanism for extending and retracting a rotor mechanism above and into an aircraft fuselage comprising a pair of screwjacks fixedly secured relative to said fuselage, motor means for creating conjoint rotative movement of said screwjacks, a support bracket having pivoted lip portions in threaded engagement with said screwjacks to be moved thereby, said support bracket being fixedly secured to said rotor mechanism, a wishbone pivotally secured to said rotor mechanism and said fuselage, such that the axis of said rotor mechanism is vertical with respect to the horizontal axis of the aircraft fuselage when in its extended position and at an acute angle with respect to said horizontal axis when in its stored position, a pitch control means for said rotor mechanism, and a linkage for operation of said pitch control means having pivotal connections on the pivotal axis of said wishbone such that movement of said rotor mechanism by said screwjacks does not affect said pitch control means.

References Cited in the file of this patent

UNITED STATES PATENTS

| | | |
|---|---|---|
| 1,789,975 | Heil et al. | Jan. 27, 1931 |
| 1,855,084 | Alvistur | Apr. 19, 1932 |
| 2,094,105 | Myers | Sept. 28, 1937 |
| 2,479,713 | Beach | Aug. 23, 1949 |